July 3, 1951 G. WALLACE 2,559,053

OIL SUMP AIR FILTER

Filed June 20, 1947

Inventor

Gordon Wallace.

By H. A. Dickman

Atty

Patented July 3, 1951

2,559,053

UNITED STATES PATENT OFFICE 2,559,053

OIL SUMP AIR FILTER

Gordon Wallace, Long Beach, Calif.

Application June 20, 1947, Serial No. 755,841

3 Claims. (Cl. 183—15)

This invention relates to an air filter of the oil sump type particularly adaptable to internal combustion engines.

An object of my invention is to provide a novel down draft air filter in which dirt and other foreign substances are effectively removed from the flow of air to the engine.

Another object is to provide an air filter of the character stated, in which there is a minimum loss of power due to impeding the flow of air to the engine.

Still another object is to provide a novel means of returning the air to the area below the air intake so that there is always a pool of oil at this point and dirt is thus caught and prevented from passing into the engine.

Still another object is to provide a novel filter pack in the cleaner which can be quickly and easily removed for purposes of cleaning and repair.

Other objects, advantages and features of invention may appear from the accompanying drawing, the subjoined detailed description and the appended claims.

Figure 1:
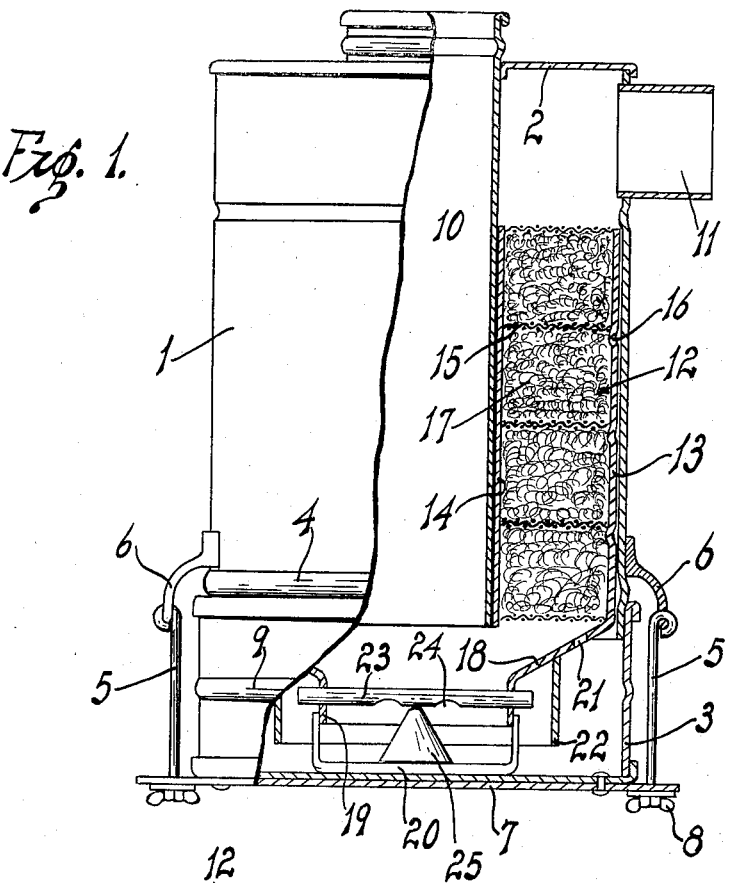
Figure 1 is a partial sectional view of my air filter, the outer shell being broken away to show interior construction.
Figure 2:
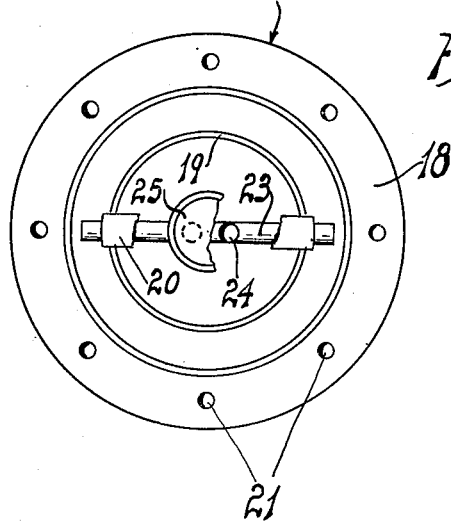
Figure 2 is a bottom plan view of the filter pack with parts broken away to show the return tube construction.

Referring more particularly to the drawing, the numeral 1 indicates an outer case or housing, which is closed at the top by the wall 2. A pan 3, fits over the bottom of the case 1, and is limited in its upward movement by a bead 4 formed on the case. The pan is held in position on the case by a pair of bails 5, 5, which are secured at their upper ends to ears 6, 6, the ears being fixedly attached to the case 1.

A strap 7, is secured to the bottom of the pan 3, and the bails 5, engage the outer ends of the strap to hold the pan in position. Each of the bails 5, are provided with a thumb nut 8, which screws onto the bottom of each bail and bears against the strap 7, thus holding the parts in assembled position. The pan 3, is partly filled with oil, the top level of the oil being approximately at the bead 9, and the incoming oil strikes the surface of this oil, all of which will be further described. The sand and dirt particles are caught by the oil and the clean oil passes upwardly through a filter pack and thence into the engine as will be subsequently described.

An intake pipe 10, is centrally positioned in the case 1, and extends upwardly in the case and through the top wall 2. The bottom of the pipe 10, terminates above the surface of the oil in the pan 3. An outlet pipe 11, extends from the case 1, adjacent the top thereof, and is connected to the oil intake of the carburettor, all of which is usual and well known.

To prevent the oil in the pan 3, from being drawn over into the engine, and also to further insure that all of the dirt will be removed from the air, I provide a filter pack 12, which comprises an outer metal ring 13, and an inner sleeve 14. The sleeve 14, closely encircles the tube 10, and at outer ring 13, closely fits the case 1.

A plurality of spaced screens 15, are arranged in the filter pack and each of these screens rests against one of the inwardly projecting beads 16, formed in the outer ring 13. A fibrous packing 17, is arranged between the screens 15, and this packing may consist of hair, steel wool, or the like. The lower end of the ring 13, is bent inwardly at the bottom to form a cone 18. The lower end of the cone is formed with a depending flange 19, to which a handle 20, is secured. The handle 20 rests against the bottom of the pan 3, shown in Figure 1, thus holding the filter pack 12, in proper position. The handle 20, also serves as a convenient means of withdrawing the filter pack from the case when it is desired to clean the same.

A plurality of holes 21, extend through the cone 18, and these holes act as relief ports so that the oil in the pan has a free vertical movement without compressing the oil in the space between the cone 18, and the surface of the oil. A depending ring, 22, extends from the cone 18, and is spaced outwardly from the flange 19. A return oil pipe 23, extends through the flange 19, and into the annular space between this flange and the ring 22. The pipe 23, is open at both ends and is provided with a pair of ports 24, adjacently center of the pipe.

A cone 25 is attached to the pipe 23, and extends downwardly. The purpose of this cone is to deflect the oil outwardly and away from the center of the air filter. In operation the incoming oil will strike the surface of the oil within the cone 18, with considerable velocity. This causes a pressure on the surface of the oil and the oil will be forced outwardly and upwardly following the contour of the cone 18, and also filling the space within the ring 22. This oil under pressure will thus be forced into the ends of the pipe 23, and will return to the center of the filter through the ports 24. Dirt and sand will be caught in the oil sump, and the clean oil will pass upwardly through the filter pack 12, and thence into the engine.

If the incoming air has sufficient velocity, as it sometimes does, the oil could be blown entirely away from the center of the oil pan 3, thus eliminating the advantages of the bath of oil. With my return oil tube 23 oil is constantly returned to the center of the oil pan 3, and thus there will always be a surface of oil to trap incoming sand or dirt. The blast pressure of the incoming air, when striking the oil in the bottom of the pan 3, will force that oil outwardly and upwardly into the space between the ring 22 and the flange 19. The level of this oil will be above the outer open end of the transverse pipe 23 and, consequently, this oil will tend to flow back through the pipe 23 and thence through the holes 24, partly by gravity and partly by the suction created by the air passing downwardly past the holes 24. The returning oil thus flows downwardly over the cone 25. It is again deflected outwardly to repeat the above named cycle.

Having described my invention, I claim:

1. An air filter comprising an outer case, a sump in the bottom of the case containing oil, a vertical intake pipe extending into the top of said case and at the center of the case, said pipe terminating above the surface of the oil, an outlet pipe extending from the case, an inverted frustroconical baffle within the case, the lower edge thereof being spaced from the bottom of the case, an oil return pipe extending horizontally through the reduced end of said baffle, said pipe having an outlet near the center of the case, the outer ends of said pipe being open to return oil from the periphery of the case to adjacent the center thereof.

2. An air filter comprising an outer case, a sump in the bottom of the case containing oil, a vertical intake pipe extending into the top of said case and at the center of the case, said pipe terminating above the surface of the oil, an outlet pipe extending from the case, an inverted frustroconical baffle within the case, the lower edge thereof being spaced from the bottom of the case, an oil return pipe extending horizontally through the reduced end of said baffle, said pipe having an outlet near the center of the case, the outer ends of said pipe being open to return oil from the periphery of the case to adjacent the center thereof, said baffle having relief ports extending therethrough, and a filter pack surrounding the intake pipe and extending between said pipe and the outer case.

3. An air filter comprising an outer case, a sump in the bottom of the case containing oil, a vertical intake pipe extending into the top of said case and at the center of the case, said pipe terminating above the surface of the oil, an outlet pipe extending from the case, an inverted frustroconical baffle within the case, the lower edge thereof being spaced from the bottom of the case, an oil return pipe extending horizontally through the reduced end of said baffle, said pipe having an outlet near the center of the case, the outer ends of said pipe being open to return oil from the periphery of the case to adjacent the center thereof, said baffle having relief ports extending therethrough, and a filter pack surrounding the intake pipe and extending between said pipe and the outer case, and a deflecting cone fixedly mounted on said pipe, the apex of said cone projecting upwardly.

GORDON WALLACE.

REFERENCES CITED

The following references are of record in the file of this patent:

UNITED STATES PATENTS

| Number | Name | Date |
| --- | --- | --- |
| 1,838,513 | Wilson | Dec. 29, 1931 |
| 2,018,493 | Halstead | Oct. 22, 1935 |
| 2,072,548 | Donaldson | Mar. 2, 1937 |
| 2,269,663 | Hallerberg et al. | Jan. 13, 1942 |
| 2,273,210 | Lowther et al. | Feb. 17, 1942 |
| 2,342,447 | Bennett et al. | Feb. 22, 1944 |
| 2,387,278 | Lowther | Oct. 23, 1945 |